United States Patent  
Ramon Real et al.

(10) Patent No.: US 11,793,226 B2
(45) Date of Patent: Oct. 24, 2023

(54) METHOD FOR THE PREPARATION OF SPHERICAL CAPSULES OF AQUEOUS SUBSTANCES AND CAPSULES OBTAINED BY SAID METHOD

(71) Applicant: CAVIAROLI, S.L., Esparreguera (ES)

(72) Inventors: Ramon Ramon Real, Barcelona (ES); Ramon Maria Ramon Ferres, Barcelona (ES)

(73) Assignee: CAVIAROLI, S.L., Barcelona (ES)

( * ) Notice: Subject to any disclaimer, the term of this patent is extended or adjusted under 35 U.S.C. 154(b) by 640 days.

(21) Appl. No.: 15/577,308

(22) PCT Filed: Mar. 14, 2016

(86) PCT No.: PCT/ES2016/070161
§ 371 (c)(1),
(2) Date: Nov. 27, 2017

(87) PCT Pub. No.: WO2016/189172
PCT Pub. Date: Dec. 1, 2016

(65) Prior Publication Data
US 2018/0213837 A1     Aug. 2, 2018

(30) Foreign Application Priority Data
May 27, 2015   (ES) ............................... ES201530737

(51) Int. Cl.
| A23P 10/30 | (2016.01) |
| A23L 29/256 | (2016.01) |
| A23L 21/15 | (2016.01) |
| C12G 3/00 | (2019.01) |
| A23F 3/16 | (2006.01) |
| A23L 27/00 | (2016.01) |
| A23L 29/00 | (2016.01) |
| A23C 9/152 | (2006.01) |

(52) U.S. Cl.
CPC ............ *A23P 10/30* (2016.08); *A23C 9/1522* (2013.01); *A23F 3/163* (2013.01); *A23L 21/15* (2016.08); *A23L 27/72* (2016.08); *A23L 29/015* (2016.08); *A23L 29/256* (2016.08); *C12G 3/00* (2013.01); *A23V 2002/00* (2013.01)

(58) Field of Classification Search
CPC ........ A23L 21/15; A23L 27/72; A23L 29/015; A23L 29/256; A23P 10/30; A23C 9/1522; A23F 3/163; C12G 3/00; A23V 2002/00

USPC .......................................................... 426/102
See application file for complete search history.

(56) References Cited

U.S. PATENT DOCUMENTS

| 4,507,327 A | 3/1985 | Ueda | |
| 4,558,037 A * | 12/1985 | Chan | A61K 31/38 514/14.9 |
| 2012/0141618 A1* | 6/2012 | Colicci | A23D 7/0053 424/777 |
| 2013/0251862 A1* | 9/2013 | Short | A23P 10/30 426/231 |

FOREIGN PATENT DOCUMENTS

| DE | 10 2007 039772 A1 | 2/2009 |
| EP | 2 289 494 A1 | 3/2011 |
| EP | 2 567 624 A1 | 3/2013 |
| GB | 762 700 A | 5/1956 |
| WO | WO 2009/022909 A1 | 2/2009 |

OTHER PUBLICATIONS

NPL Alginate solution pH. (Retrieved on Jan. 22, 2020). (Year: 2020).*
NPL Olive oil density (Retrieved on Dec. 16, 2020). (Year: 2020).*
Spanish Search Report, dated Jul. 7, 2015, in ES Application No. 201530737.
International Search Report & Written Opinion, dated May 20, 2016, in International Application No. PCT/ES2016/070161.
Stougaard, Fruit "Caviar", Adventures in Molecular Cooking [9], Internet Citation retrieved Jul. 6, 2015. [URL:<https://mulastbite.wordpress.com/2008/12/31/adventures-in-molecular-cooking-3>].
Stougaard, Reverse Spherification, Adventures in Molecular Cooking [2], Internet Citation, Dec. 22, 2008, pp. 1-4, Dec. 22, 2008.
Wunwisa, K., et al, Evaluation of Encapsulation Techniques of Probiotics for Yoghurt, International Dairy Journal, vol. 13, No. 1, pp. 3-13, Jan. 1, 2003.
Office Action, dated May 20, 2019, in Japanese Patent Application No. 2018-513916.

* cited by examiner

*Primary Examiner* — Erik Kashnikow
*Assistant Examiner* — Bhaskar Mukhopadhyay
(74) *Attorney, Agent, or Firm* — Knobbe, Martens, Olson & Bear LLP

(57) ABSTRACT

Capsules contain in their interior a water-based substance, and are coated with a film of alginate of an alkaline earth metal selected from calcium and magnesium. The capsules are of a larger size than previous capsules, while maintaining their sphericality. The capsules of water-based substances are obtained by incubating the capsules in suspension.

14 Claims, No Drawings

METHOD FOR THE PREPARATION OF SPHERICAL CAPSULES OF AQUEOUS SUBSTANCES AND CAPSULES OBTAINED BY SAID METHOD

PRIORITY AND CROSS REFERENCE TO RELATED APPLICATIONS

This application is the U.S. National Stage Application under 35 U.S.C. § 371 of International Application No. PCT/ES2016/070161, filed Mar. 14, 2016, designating the U.S. and published as WO 2016/189172 A1 on Dec. 1, 2016, which claims the benefit of Spanish Patent Application No. P 201530737, filed May 27, 2015. Any and all applications for which a foreign or a domestic priority is claimed is/are identified in the Application Data Sheet filed herewith and is/are hereby incorporated by reference in their entirety under 37 C.F.R. § 1.57.

FIELD

The present invention refers to capsules containing in their interior a water-based substance coated with a film of alginate of an alkaline earth metal selected from calcium and magnesium, said capsules being of a larger size than the capsules known in the prior art, while maintaining their sphericity. The capsules of water-based substances according to the present invention are obtained by a method that has notable features of novelty and inventive step.

SUMMARY

The capsules of the present invention are obtained by a process commonly known as "reverse spherification". Normally, the basic or direct spherification method is used, in which a drop or drops of the product to be encapsulated surrounded by a film of non-calcium alginate is or are allowed to fall into a bath containing a source of calcium ions, generally calcium chloride. However, this method has the disadvantages that the calcium ions trapped by the alginate in its gelling process can significantly modify the flavour of the substance to be encapsulated, and furthermore the calcium ions quickly spread towards the interior of the gelled sphere, making it impossible to obtain spheres that contain liquid in their interior and are stable over time.

DETAILED DESCRIPTION

In reverse spherification, the substance to be encapsulated is mixed with a source of calcium or magnesium ions, for example calcium chloride. If the substance to be encapsulated is a liquid food product, said calcium or magnesium salt must not affect the flavour of the liquid food product to be encapsulated. Next, a drop or other shape is formed with said mixture of the substance to be encapsulated and the calcium or magnesium ions, and is introduced into a solution containing a non-calcium alginate, for example sodium alginate. When the formed drop containing calcium ions comes into contact with the solution containing alginate, a semi-solid and gelatinous film is formed almost instantaneously, which contains in its interior the substance to be encapsulated.

Reverse spherification is a method known in the state of the art. For example, patent application PCT WO2011/138478 discloses a reverse spherification method in which carbonated drinks such as sparkling wines are encapsulated.

However, the reverse spherification method has numerous disadvantages. For example, the alginate solution generally has a density greater than that of water and a surface tension that the drops must overcome in order to pass through the air/alginate interface and then fall into the alginate solution.

A further problem posed by the reverse spherification method is that when it is wished to increase the size of the drop or sphere, said drop or sphere tends to deform due to surface tension, and when it is introduced into the alginate solution, it can take a non-spherical final shape, for example the shape of a teardrop or a double teardrop, once the spherification reaction is completed. If the drop does not have sufficient density, it can even take the form of a sheet floating in the alginate solution. This fact significantly affects the aesthetic appearance of said capsules, especially when their intended use is for consumption in restaurants.

After exhaustive studies, the inventor of the present patent has developed a reverse spherification method that overcomes the problems of the methods of the prior art. Using the method of the present invention, it is possible to produce on an industrial scale capsules of food products with a surprisingly spherical form. Moreover, it is possible to increase the diameter of said capsules to sizes of up to 50 mm, far larger than the encapsulated food products known in the prior art.

The present invention is based on the use of a buffering oily interface that is present in the form of a layer on the surface of the alginate solution. Said buffering oily interface, being constituted by a phase different from that of the aqueous substance to be encapsulated, surprisingly allows a rounding of the drop of aqueous substance to be encapsulated before it comes into contact with the alginate solution. This same effect occurs when said oily interface is dispersed or even emulsified in the alginate solution. When the drop comes into contact with the alginate solution, it is maintained in suspension for a sufficient time for the gelling reaction to occur and for it to maintain its spherical form.

Therefore, the present invention discloses a method for the preparation of capsules of aqueous substances, characterised in that it comprises the following steps:

a) mixing a source of ions of an alkaline earth metal selected from calcium and magnesium with an aqueous substance to be encapsulated;

b) forming a drop or drops of the mixture of step (a) and introducing said drop or drops into an aqueous solution containing a non-calcium alginate, said aqueous solution of non-calcium alginate comprising an oily interface in the form of a buffering layer, in order to form the capsules;

c) incubating the capsules formed in step (b) in suspension for a time of between 2 seconds and 2 hours;

d) washing, draining and packaging the capsules.

In the method of the present invention, the aqueous solution to be encapsulated may preferably be a liquid food product selected from fruits and fruit pulps, olives, milk products, infusions, seasoned products, vinegars, spirit drinks, wines, alcoholic beverages, fermented juices (for example, soya), or any water-based substance in liquid state or resulting from the extraction of any type of solid whose juice has a preferably aqueous content.

It will be obvious to a person skilled in the art that the source of calcium ions used in the method of the invention may be any source of calcium ions that does not significantly affect the flavour or organoleptic properties of the aqueous substance to be encapsulated. Said sources of calcium ions include, for example, calcium chloride, calcium lactate, calcium gluconate, or a mixture thereof. Preferably, the source of calcium ions is calcium chloride.

On the other hand, the buffering oily interface may be in the form of a layer in the upper part of the alginate solution, but may also be partially or totally dispersed or emulsified in said alginate solution. It may also be formed of any oily substance, such as oils, liquid fats or any oily solution that has a density lower than that of the alginate solution. It may also take the form of an oily emulsion. Preferably, said buffering oily layer is formed of olive oil, grapeseed oil, soya oil, sunflower oil or mixtures thereof, where such mixtures have any of the foregoing oils as their base.

The alginate solution of the method of the present invention may be any non-calcium alginate salt, provided that it reacts in the presence of calcium ions and forms the exterior calcium alginate film of the capsules. Preferably, the alginate used is sodium alginate.

The concentration of the non-calcium alginate salt may be in the range of 0.05% to 10% by weight of the alginate solution. The pH of said solution may be between 2 and 14.

The drops of the aqueous substance to be encapsulated may be formed by any method known to a person skilled in the art.

An additional advantage of the method of the present invention is that all of the steps are performed at ambient temperature. An increase or decrease in temperature, as well as increasing the production costs of the capsules, may affect the viscosity, density and surface tension of the oily and aqueous phases present in the method, so that it would also be necessary to modify various parameters of the method in order to obtain the same results as at ambient temperature.

The present invention also relates to food capsules obtained by the method described above. As mentioned previously, said capsules can be of a much larger size than the capsules obtained by the methods of the prior art.

Therefore, the method discloses a spherical food capsule that contains in its interior an aqueous substance surrounded by a film of calcium alginate, characterised in that the diameter of said spherical food capsule is in the range of 1 mm to 50 mm, preferably in the range of 5 mm to mm, more preferably 10 mm to 50 mm, even more preferably 15 mm to 50 mm, 20 mm to 50 mm, 25 mm to 50 mm, and most preferably 30 to 50 mm.

EXAMPLES

Example 1. Preparation of Fruit Pulp Food Capsules According to the Method of the Present Invention A commercial purée of strawberry was taken, and to this were added 10% (v/v) water, calcium lactate at 2% by weight and xanthan gum at 0.5% by weight. The solution to be encapsulated was agitated until a uniform mixture was obtained. A solution of sodium alginate at 0.5% by weight with a pH of 4.0 was then prepared. Sunflower oil was then added to serve as a buffering oily interface.

Next, the alginate solution was introduced into a bath at ambient temperature. The buffer solution was then poured in, and drops of the solution to be encapsulated were allowed to fall into the bath. After 20 minutes, said drops were collected and introduced into a bath of water for washing. They were then drained and packaged.

The result was at least one sphere of 49 mm in diameter, suitable for consumption and intended for the preparation of desserts.

Example 2. Preparation of Food Capsules Containing an Infusion According to the Method of the Present Invention An infusion of green tea was prepared, and to this were added potassium sorbate at 0.5% by weight, citric acid to adjust the pH to 3.5, calcium lactate at 1% by weight and xanthan gum at 0.4% by weight. The solution to be encapsulated was agitated until a uniform mixture was obtained. A solution of sodium alginate at 1% by weight with a pH of 6.0 was then prepared. Olive oil was then added to serve as a buffering oily interface.

Next, the alginate solution was introduced into a bath at ambient temperature. The buffer solution was then poured in, and drops of the solution to be encapsulated were allowed to fall into the bath. After 5 minutes, said drops were collected and introduced into a bath of water for washing. They were then drained and packaged.

The result was at least one sphere of 4 mm in diameter, suitable for consumption and intended for the preparation of any type of dish.

Example 3. Preparation of Food Capsules Containing a Milk Product According to the Method of the Present Invention A commercial sugared natural yoghurt was taken. The solution to be encapsulated was agitated until a uniform mixture was obtained. A solution of sodium alginate at 0.7% by weight with a pH of 5.0 was then prepared. Grapeseed oil was then added to serve as a buffering oily interface.

Next, the alginate solution was introduced into a bath at ambient temperature. The buffer solution was then poured in, and drops of the solution to be encapsulated were allowed to fall into the bath. After 3 minutes, said drops were collected and introduced into a bath of water for washing. They were then drained and packaged.

The result was at least one sphere of 8 mm in diameter, suitable for consumption and intended for the preparation of desserts.

Example 4. Preparation of Food Capsules Containing an Alcoholic Beverage According to the Method of the Present Invention One litre of a commercial wine was taken, and to this were added 10% (v/v) water, potassium sorbate at 1.5%, citric acid to adjust the pH to 5.2, calcium lactate and xanthan gum at 0.6% by weight. The solution to be encapsulated was agitated until a uniform mixture was obtained. A solution of sodium alginate at 0.5% by weight with a pH of 6.0 was then prepared. Soya oil was then added to serve as a buffering oily interface.

Next, the alginate solution was introduced into a bath at ambient temperature. The buffer solution was then poured in, and drops of the solution to be encapsulated were allowed to fall into the bath. After 4 minutes, said drops were collected and introduced into a bath of water for washing. They were then drained and packaged.

The result was at least one sphere of 10 mm in diameter, suitable for consumption and intended for the preparation of any type of dish.

Although the invention has been described with respect to preferred embodiments, said embodiments must not be regarded as limitative of the invention, which will be defined by the broadest interpretation of the following claims.

What is claimed is:

1. A method for the preparation of spherical capsules of aqueous substances, wherein the method comprises the following steps:
   (a) mixing a source of ions of an alkaline earth metal selected from calcium and magnesium with an aqueous substance to be encapsulated to obtain a mixture, wherein the aqueous substance to be encapsulated is a liquid food product selected from liquid fruits, liquid olives, milk products, infusions, vinegars, spirit drinks, wines, alcoholic beverages, fermented juices (for example, soya), or any water-based substance in liquid state or resulting from the extraction of any type of solid whose juice has an aqueous content;
   (b) introducing the mixture into a buffering oily layer to form a drop or drops of the mixture within said buffering oily layer, the buffering oily layer being formed on the surface of an aqueous solution containing a non-calcium alginate;
   (c) rounding the drop or drops into spherical form within the buffering oily layer;
   (d) permitting the rounded drop or drops to fall into the aqueous solution from the buffering oily layer;
   (e) maintaining the rounded drop or drops in suspension in the aqueous solution while maintaining the spherical form of the rounded drop or drops for a sufficient time to form a spherical capsule or capsules from the rounded drop or drops within the aqueous solution;
   (f) in collecting the capsule or capsules formed in step (d);
   (g) incubating the collected capsules from step (e) in suspension for a time of between 2 seconds and 2 hours;
   (h) washing, draining and packaging the capsules.

2. The method according to claim 1, wherein the source of calcium ions is selected from the group consisting of calcium chloride, calcium lactate, calcium gluconate, and a mixture thereof.

3. The method according to claim 1, wherein the source of calcium ions is calcium chloride.

4. The method according to claim 1, wherein the buffering oily layer is formed by olive oil, grapeseed oil, soya oil, sunflower oil or mixtures thereof.

5. The method according to claim 1, wherein the non-calcium alginate used is sodium alginate.

6. The method according to claim 1, wherein the concentration of the non-calcium alginate is in the range of 0.05% to 10% by weight in relation to the alginate solution.

7. The method according to claim 1, wherein the pH of the non-calcium alginate solution is between 2 and 14.

8. A spherical capsule containing an aqueous solution, obtained by the method of claim 1, comprising in its interior a liquid food product, wherein said liquid food product is selected from the group consisting of liquid fruits, liquid olives, milk products, infusions, vinegars, spirit drinks, wines, alcoholic beverages, fermented juices (for example, soya), and any water-based substance in liquid state or resulting from the extraction of any type of solid whose juice has an aqueous content, the interior surrounded by a film of calcium alginate, wherein said spherical food capsule has a diameter in the range of 5 mm to 50 mm.

9. The spherical capsule containing an aqueous solution, according to claim 8, wherein the diameter of said capsule is in the range of 10 mm to 50 mm.

10. The spherical capsule containing an aqueous solution, according to claim 8, wherein the diameter of said capsule is in the range of 12 mm to 50 mm.

11. The spherical capsule containing an aqueous solution, according to claim 8, wherein the diameter of said capsule is in the range of 15 mm to 50 mm.

12. The spherical capsule containing an aqueous solution, according to claim 8, wherein the diameter of said capsule is in the range of 20 mm to 50 mm.

13. The spherical capsule containing an aqueous solution, according to claim 8, wherein the diameter of said capsule is in the range of 25 mm to 50 mm.

14. The spherical capsule containing an aqueous solution, according to claim 8, wherein the diameter of said capsule is in the range of 30 mm to 50 mm.

* * * * *